United States Patent [19]

Abbott

[11] Patent Number: 4,819,431

[45] Date of Patent: Apr. 11, 1989

[54] METHOD OF AND SYSTEM FOR CONTROLLING A FLUIDIC VALVE

[75] Inventor: Adrian Abbott, Southampton, England

[73] Assignee: Plessey Overseas Limited, Ilford, England

[21] Appl. No.: 908,764

[22] Filed: Sep. 18, 1986

[30] Foreign Application Priority Data

Sep. 18, 1985 [GB] United Kingdom ................. 8523086

[51] Int. Cl.[4] ................................................. F02K 9/26

[52] U.S. Cl. .................................... 60/204; 60/39.462; 60/254; 137/813

[58] Field of Search ...................... 60/39.462, 218, 254, 60/204; 137/808, 810, 812, 813

[56] References Cited

U.S. PATENT DOCUMENTS

| | | | |
|---|---|---|---|
| 2,721,788 | 10/1955 | Schad | 60/39.462 |
| 3,345,822 | 10/1967 | Povinelli et al. | 60/254 |
| 3,426,534 | 2/1969 | Murphy | 137/812 |
| 3,513,865 | 5/1970 | Van Der Heyden | 137/808 |
| 3,618,324 | 11/1971 | Monding | 60/39.462 |
| 3,702,536 | 11/1972 | Gregory | 137/813 |
| 3,732,693 | 5/1973 | Chu | 60/218 |
| 4,059,415 | 11/1977 | Kosaka et al. | 60/39.462 |

*Primary Examiner*—Louis J. Casaregola
*Attorney, Agent, or Firm*—Michael F. Oglo; Julian C. Renfro

[57] ABSTRACT

A method of controlling the flow of gas emerging from the outlet of a fluidic vortex valve, the method comprising feeding a supply fluid to an inlet of the vortex chamber associated with the fluidic vortex valve whereby a supply gas flow is injected into the vortex chamber in a substantially radial direction, feeding in a controlled manner via a valve member a control fluid to a second inlet of the vortex chamber whereby a control fluid flow is injected into the vortex chamber in a substantially tangential direction wherein the improvement lies in providing that the control fluid is in the form of a liquid monopropellant at least until after it has flowed past the valve member, and providing means for igniting the liquid monopropellant thereafter to generate the control gas flow in the vortex chamber.

3 Claims, 2 Drawing Sheets

METHOD OF AND SYSTEM FOR CONTROLLING A FLUIDIC VALVE

BACKGROUND OF THE INVENTION

The present invention relates to a method of and system for controlling a fluidic valve, and more particularly relates to a method of and system for controlling a fluidic vortex valve.

A conventional fluidic vortex valve is illustrated in FIGS. 1(*a*) and 1(*b*) of the accompanying drawings. The vortex valve has a housing 2 defining within it a cylindrical vortex chamber 4, the vortex chamber 4 being provided with two inlet ports 6, 8 and a centrally located outlet port 10. The central axis of the outlet port 10 is orthogonal to the central axes of the inlet ports 6, 8. The inlet port 6 and the outlet port 10 have a relatively large area compared to that of the inlet port 8.

When in use a supply fluid is injected radially into the vortex chamber 4 through the inlet port 6 and a control fluid is injected tangentially through the inlet port 8. If no fluid is injected into the inlet port 8 then substantially no tangential swirl is imparted to the supply fluid. The supply fluid flows through the vortex chamber 4 passing through a right angle to flow into the centrally located outlet port 10. There is little or no pressure gradient within the chamber 4 and the flow of fluid through the vortex valve is at its maximum level (FIG. 1(*a*)). If on the other hand the pressure of the control fluid exceeds the pressure of the supply fluid, the momentum of the interacting fluid streams generates a vortex within the chamber 4. The generation of the vortex gives rise to a radial pressure gradient within the chamber 4, the pressure gradient being dependent on, and increasing with, the pressure of the control fluid injected through the inlet port 8. If the pressure of the control fluid is increased relative to the pressure of the supply fluid beyond a predetermined limit the effect is to virtually arrest the flow of fluid through the inlet port 6. The fluid flow out of the vortex valve would in such a circumstance be equal to the flow of the control fluid entering the chamber 4 (FIG. 1(*b*)).

A known device for controlling the flow of the control fluid into the chamber 4 operates on electromagnetic principles. The device basically comprises a moving coil or moving iron mounted for rotation in response to an electrical signal received from a controller. A pin is mounted to pivot in response to rotation of the moving coil or iron, the pin being located adjacent to the inlet of a duct through which the control fluid is to be injected to the inlet port 8. The position of the pin relative to the inlet of the duct determines the pressure of the control fluid entering the chamber 4. The known device has been proposed for use in a method of and system for controlling vortex valves associated with thrusters used on missiles, the controller being the missile auto pilot. Such electromagnetically operable devices are in general not very robust and problems may arise from the high self induced stresses experienced when the devices are subjected to the extremely high gravitational forces created during the firing of a modern missile. Furthermore, the pin would have to operate in a high temperature highly corrosive gas environment, such as that found in the ducting associated with fluidic vortex valves used in guided missiles, In consequence, problems may arise in the manufacturing design of the pin or some alternative valve member which was used to control the tangential flow of hot gas emerging from the inlet port 8. In practice the valve member must be capable of accurately carrying out its function in the gas environment for a period at least equal to the expected flight duration of the missile.

SUMMARY OF THE INVENTION

An objective of the present invention is to provide an alternative method of and system for controlling a fluidic vortex valve in a modern missile, the method being one in which and the system being one in which the valve member does not function in a hot gas environment but in a relatively cool liquid environment.

According to the present invention there is provided a method of controlling the flow of gas emerging from the outlet of a fluidic vortex valve, the method comprising feeding a supply fluid to an inlet of the vortex chamber associated with the fluidic vortex valve whereby a supply gas flow is injected into the vortex chamber in a substantially radial direction, feeding in a controlled manner via a valve member a control fluid to a second inlet of the vortex chamber whereby a control fluid flow is injected into the vortex chamber in a substantially tangential direction wherein the improvement lies in providing that the control fluid is in the form of a liquid monopropellant at least until after it has flowed past the valve member, and providing means for igniting the liquid monopropellant thereafter to generate the control gas flow in the vortex chamber.

According to the present invention there is also provided a system for controlling a fluidic vortex valve, the system comprising a source of supply fluid and means for feeding the supply fluid to a vortex chamber associated with the fluidic vortex valve for injecting a supply gas flow into the vortex chamber in a substantially radial direction, a source of control fluid and means for feeding in a controlled manner via a valve member the control fluid to the vortex chamber for injecting a control fluid flow into the vortex chamber in a substantially tangential direction wherein the improvement lies in that the source of control fluid is a liquid monopropellant and means are provided downstream from the valve member for igniting the liquid monopropellant to generate the control gas flow in the vortex chamber.

BRIEF DESCRIPTION OF THE DRAWINGS

The present invention will be described further by way of example with reference to, and as illustrated in, the accompanying drawings in which.

DESCRIPTION OF EMBODIMENTS

Figure 2A:
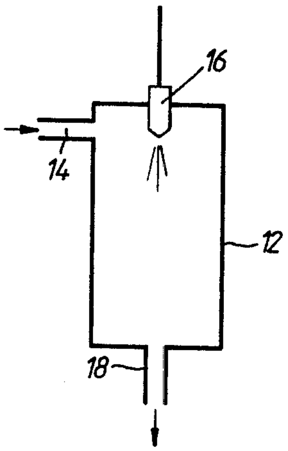
Figure 2B:
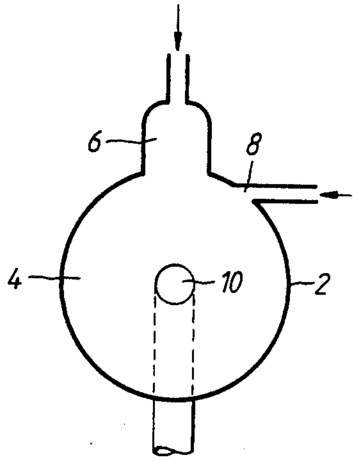

Referring to FIG. 2(*a*) there is shown a combustion chamber 12 into which is fed via an inlet duct 14 a supply of hot gas at a temperature above 500° C. If a spray of liquid monopropellant, such as iso-propyl nitrate (I.P.N.), is fed into the chamber 12 via a nozzle 16 the I.P.N. will ignite and produce a large quantity of additional gas. The additional gas combines with the gas flowing into the chamber 12 through the duct 14 to form a combined gas flow through an outlet duct 18.

Figure 1A:
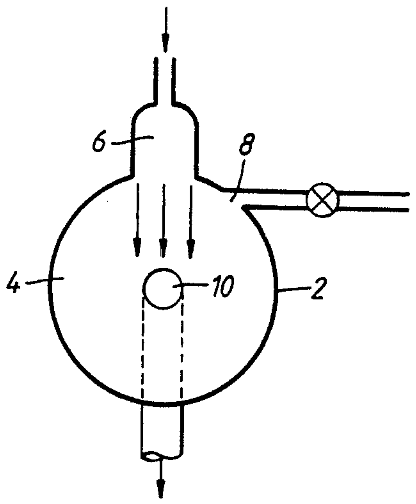
FIG. 1(a). PRIOR ART
FIGS. 1(*a*) and 1(*b*) illustrate the operation of a conventional fluidic vortex valve, FIGS. 2(*a*) and 2(*b*) illustrate the operational principle of one embodiment of the present invention.
Figure 1B:
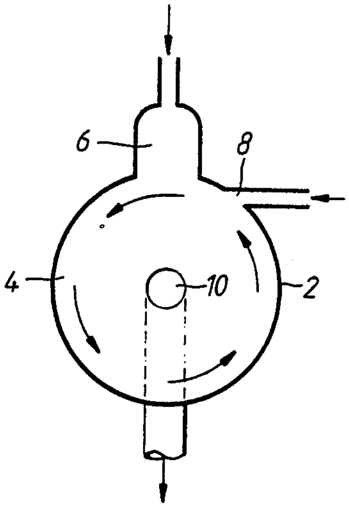
FIG. 1(b). PRIOR ART

FIG. 2(*b*) illustrates a fluidic vortex valve like that shown in FIG. 1(*a*) and 1(*b*). In FIG. 2(*b*), however, the vortex chamber 4 may be regarded as a combustion chamber. In operation hot gas from a supply fluid is fed into the chamber 4 from the duct 6 and emerges from the outlet port 10. If a decrease in gas flow is required, liquid monopropellant is injected into the chamber 4 through the inlet port 8 where it burns to produce a large volume of gas causing a vortex and reducing the outlet gas flow. The control and switching of the cold liquid monopropellant is easily achieved by providing any of a number of suitable valves upstream of the inlet port 8.

Figure 3:
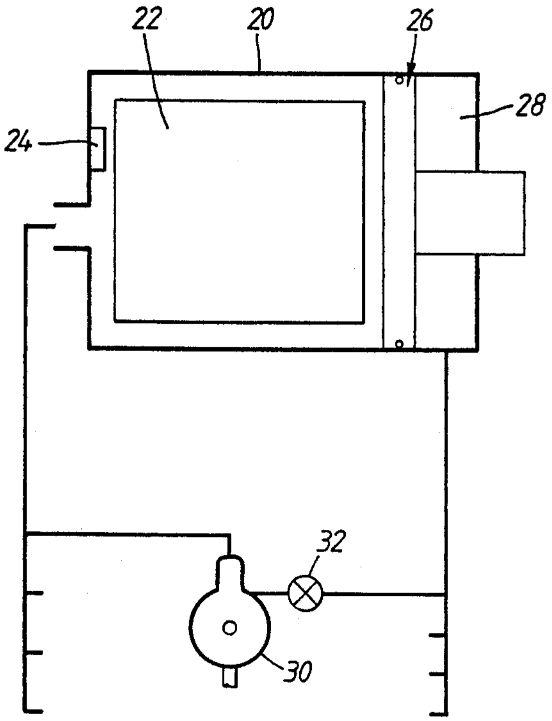
FIG. 3 illustrates a system according to one embodiment of the present invention.

An example of a complete system is illustrated in FIG. 3.

A housing 20 contains a source of supply fluid in the form of a solid propellant charge 22 and an igniter 24. The housing 20 also contains a piston assembly 26 and a liquid monopropellant 28.

The piston assembly 26 consists of a large piston with a tail rod so arranged that if a pressure is produced within that portion of the housing 20 containing the solid propellant 22, a higher pressure is produced in the liquid volume of the propellant 28 by the ratio of A0/(A0-A1), where A0 is the area defined by the piston and A1 is the area defined by the tail rod.

Monopropellant is fed to one of a number of vortex valves 30 via a valve 32.

In operation the solid propellant charge 22 is ignited by the igniter 24 and produces a hot supply gas at a pressure of, for example, 1000 psi, which also produces a pressure in the liquid monopropellant 28 of, for example, 1500 psi.

The hot supply gas flows through the vortex valve 30 without hindrance until the valve 32 is opened which admits monopropellant tangentially into the vortex valve 30. The heat and pressure in the vortex valve 30 causes the monopropellant to decompose and produce gas, reinforcing the vortex and reducing the hot gas flow from the supply gas inlet 6 (see FIG. 2(*b*)).

Typically the mass of the liquid propellant may be 10% of the mass of the solid propellant.

If the valve 32 is proportional in its operation, a proportionally variable control of the vortex valve 30 is possible.

Figure 4:
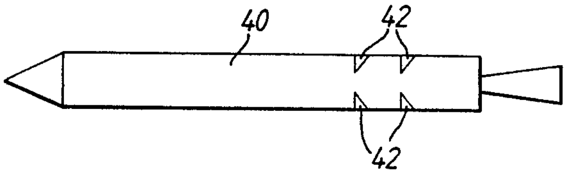
FIG. 4 illustrates schematically a missile incorporating thrusters having systems according to the present invention.

In FIG. 4 there is shown a missile 40 having a number of thrusters 42 disposed around regions of its periphery. The thruster 42 serve to orientate the missile in flight by exhausting jets of gas in a controlled manner. Each of the thrusters incorporates a fluidic vortex valve the output gas from which is controlled by adjusting the flow of liquid monopropellant through a liquid control valve located in a duct leading to the vortex chamber as for example as shown in FIG. 3.

I claim:

1. A method of controlling the flow of gas emerging from the outlet of a fluidic vortex valve, the method comprising feeding a supply fluid to an inlet of a vortex chamber defined within the fluidic vortex valve whereby a supply gas flow is injected into the vortex chamber in a substantially radial direction, feeding in a controlled manner a control fluid to a second inlet of the vortex chamber whereby a control fluid flow is injected into the vortex chamber in a substantially tangential direction wherein the improvement lies in providing the control fluid in the form of a liquid monopropellant, feeding the liquid monopropellant to the second inlet of the vortex chamber via a liquid control valve, and injecting the supply gas at a temperature sufficient to ignite the liquid monopropellant so that the liquid monopropellant burns and becomes gaseous forming a vortex in the vortex chamber which controls the flow of gas emerging from the outlet of the fluidic vortex valve.

2. A system for controlling a fluidic vortex valve, the system comprising a source of supply fluid and means for feeding the supply fluid to a first inlet of a vortex chamber defined within the fluidic vortex valve for injecting a supply gas flow into the vortex chamber in a substantially radial direction, a source of control fluid and means for feeding in a controlled manner the control fluid to a second inlet of the vortex chamber for injecting a control gas flow into the vortex chamber in a substantially tangential direction wherein the improvement lies in that the source of control fluid is a liquid monopropellant a liquid control valve is connected in a duct connecting the source of liquid monopropellant to the second inlet of the vortex chamber, and the means for feeding the supply fluid injects the supply gas flow at a temperature sufficient to ignite the liquid monopropellant so that the liquid monopropellant burns and becomes gaseous forming a vortex in the vortex chamber which control the flow of gas emerging from the outlet of the fluidic vortex valve.

3. A missile having a plurality of thrusters, the thrusters each incorporating a fluidic vortex valve controlled by the system as claimed in claim 2.

* * * * *